(12) United States Patent
Hotelling et al.

(10) Patent No.: US 8,552,998 B2
(45) Date of Patent: Oct. 8, 2013

(54) SIMULTANEOUS SENSING ARRANGEMENT

(75) Inventors: Steven P. Hotelling, Los Gatos, CA (US); John Greer Elias, Townsend, DE (US); Kapil Vinod Sakariya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/874,184

(22) Filed: Sep. 1, 2010

(65) Prior Publication Data
US 2010/0328265 A1     Dec. 30, 2010

Related U.S. Application Data

(62) Division of application No. 11/619,433, filed on Jan. 3, 2007, now Pat. No. 7,812,827.

(51) Int. Cl.
*G06F 3/041* (2006.01)
*G09G 5/00* (2006.01)

(52) U.S. Cl.
USPC .......................................... 345/173; 345/156

(58) Field of Classification Search
USPC ............ 345/156–184, 104; 178/18.01–20.04
See application file for complete search history.

(56) References Cited

U.S. PATENT DOCUMENTS

| | | | |
|---|---|---|---|
| 3,732,369 A | 5/1973 | Cotter | |
| 3,818,133 A | 6/1974 | Cotter | |
| 4,071,691 A * | 1/1978 | Pepper, Jr. | 178/18.05 |
| 4,129,747 A * | 12/1978 | Pepper, Jr. | 178/18.05 |
| 4,444,998 A * | 4/1984 | House | 178/18.05 |
| 4,550,221 A | 10/1985 | Mabusth | |
| 4,680,429 A * | 7/1987 | Murdock et al. | 178/20.02 |
| 4,916,308 A | 4/1990 | Meadows | |
| 5,105,186 A | 4/1992 | May | |

(Continued)

FOREIGN PATENT DOCUMENTS

| | | |
|---|---|---|
| GB | 1 440 130 A | 6/1976 |
| JP | 2000-163031 A | 6/2000 |

(Continued)

OTHER PUBLICATIONS

International Search Report mailed Apr. 6, 2009, for PCT Application No. PCT/US2007/088750, filed Dec. 21, 2007, six pages.

(Continued)

*Primary Examiner* — Vijay Shankar
*Assistant Examiner* — Patrick F Marinelli
(74) *Attorney, Agent, or Firm* — Morrison & Foerster LLP

(57) ABSTRACT

Multi-touch touch-sensing devices and methods are described herein. The touch sensing devices can include multiple sense points, each located at a crossing of a drive line and a sense line. In some embodiments, multiple drive lines may be simultaneously or nearly simultaneously stimulated with drive signals having unique characteristics, such as phase or frequency. A sense signal can occur on each sense line that can be related to the drive signals by an amount of touch present at sense points corresponding to the stimulated drive lines and the sense line. By using processing techniques based on the unique drive signals, an amount of touch corresponding to each sense point can be extracted from the sense signal. The touch sensing methods and devices can be incorporated into interfaces for a variety of electronic devices such as a desktop, tablet, notebook, and handheld computers, personal digital assistants, media players, and mobile telephones.

17 Claims, 7 Drawing Sheets

(56) References Cited

U.S. PATENT DOCUMENTS

| | | | |
|---|---|---|---|
| 5,357,266 A | 10/1994 | Tagawa et al. | |
| 5,483,261 A | 1/1996 | Yasutake | |
| 5,488,204 A | 1/1996 | Mead et al. | |
| 5,825,352 A | 10/1998 | Bisset et al. | |
| 5,831,600 A * | 11/1998 | Inoue et al. | 345/173 |
| 5,835,079 A | 11/1998 | Shieh | |
| 5,838,308 A | 11/1998 | Knapp et al. | |
| 5,861,583 A | 1/1999 | Schediwy et al. | |
| 5,880,411 A | 3/1999 | Gillespie et al. | |
| 5,920,309 A * | 7/1999 | Bisset et al. | 345/173 |
| 6,043,810 A | 3/2000 | Kim et al. | |
| 6,057,903 A | 5/2000 | Colgan et al. | |
| 6,177,918 B1 | 1/2001 | Colgan et al. | |
| 6,188,391 B1 | 2/2001 | Seely et al. | |
| 6,204,897 B1 | 3/2001 | Colgan et al. | |
| 6,310,610 B1 | 10/2001 | Beaton et al. | |
| 6,323,846 B1 | 11/2001 | Westerman et al. | |
| 6,483,498 B1 | 11/2002 | Colgan et al. | |
| 6,501,529 B1 | 12/2002 | Kurihara et al. | |
| 6,680,448 B2 | 1/2004 | Kawashima et al. | |
| 6,690,387 B2 | 2/2004 | Zimmerman et al. | |
| 7,015,894 B2 | 3/2006 | Morohoshi | |
| 7,042,444 B2 | 5/2006 | Cok | |
| 7,133,032 B2 | 11/2006 | Cok | |
| 7,184,064 B2 | 2/2007 | Zimmerman et al. | |
| 7,202,856 B2 | 4/2007 | Cok | |
| 7,230,608 B2 | 6/2007 | Cok | |
| 7,230,609 B2 | 6/2007 | Chao et al. | |
| 7,280,167 B2 | 10/2007 | Choi et al. | |
| 7,339,499 B2 * | 3/2008 | Khlat | 341/26 |
| 7,379,054 B2 | 5/2008 | Lee | |
| 7,812,827 B2 | 10/2010 | Hotelling et al. | |
| 2002/0015024 A1 | 2/2002 | Westerman et al. | |
| 2002/0084992 A1 | 7/2002 | Agnew | |
| 2003/0063073 A1 | 4/2003 | Geaghan et al. | |
| 2003/0067447 A1 * | 4/2003 | Geaghan et al. | 345/173 |
| 2003/0197691 A1 | 10/2003 | Fujiwara et al. | |
| 2004/0109097 A1 | 6/2004 | Mai | |
| 2004/0141096 A1 | 7/2004 | Mai | |
| 2004/0189587 A1 | 9/2004 | Jung et al. | |
| 2005/0052582 A1 | 3/2005 | Mai | |
| 2005/0231487 A1 | 10/2005 | Ming | |
| 2005/0243023 A1 | 11/2005 | Reddy et al. | |
| 2006/0007165 A1 | 1/2006 | Yang et al. | |
| 2006/0022955 A1 * | 2/2006 | Kennedy | 345/173 |
| 2006/0022959 A1 * | 2/2006 | Geaghan | 345/173 |
| 2006/0026521 A1 | 2/2006 | Hotelling et al. | |
| 2006/0097991 A1 * | 5/2006 | Hotelling et al. | 345/173 |
| 2006/0145365 A1 | 7/2006 | Halls et al. | |
| 2006/0146033 A1 | 7/2006 | Chen et al. | |
| 2006/0146034 A1 | 7/2006 | Chen et al. | |
| 2006/0197750 A1 | 9/2006 | Kerr et al. | |
| 2006/0197753 A1 | 9/2006 | Hotelling | |
| 2006/0244736 A1 | 11/2006 | Tseng | |
| 2007/0018969 A1 | 1/2007 | Chen et al. | |
| 2007/0075977 A1 | 4/2007 | Chen et al. | |
| 2007/0109274 A1 | 5/2007 | Reynolds | |
| 2007/0176905 A1 | 8/2007 | Shih et al. | |
| 2007/0216657 A1 | 9/2007 | Konicek | |
| 2007/0257890 A1 | 11/2007 | Hotelling et al. | |
| 2007/0262967 A1 | 11/2007 | Rho | |
| 2008/0012835 A1 | 1/2008 | Rimon et al. | |
| 2008/0048989 A1 | 2/2008 | Yoon et al. | |
| 2008/0048994 A1 | 2/2008 | Lee et al. | |
| 2008/0055221 A1 | 3/2008 | Yabuta et al. | |
| 2008/0055268 A1 | 3/2008 | Yoo et al. | |
| 2008/0067528 A1 | 3/2008 | Choi et al. | |
| 2008/0074401 A1 | 3/2008 | Chung et al. | |
| 2008/0088594 A1 | 4/2008 | Liu et al. | |
| 2008/0129898 A1 | 6/2008 | Moon | |
| 2008/0136980 A1 | 6/2008 | Rho et al. | |
| 2008/0143683 A1 | 6/2008 | Hotelling | |
| 2008/0150920 A1 | 6/2008 | Lowles et al. | |
| 2008/0158167 A1 | 7/2008 | Hotelling et al. | |
| 2011/0084857 A1 * | 4/2011 | Marino et al. | 341/5 |

FOREIGN PATENT DOCUMENTS

| | | |
|---|---|---|
| JP | 2002-342033 A | 11/2002 |
| WO | WO-2008/010917 A1 | 1/2008 |
| WO | WO-2008/085719 A2 | 7/2008 |

OTHER PUBLICATIONS

Kanda, E. et al. (2008). "55.2: Integrated Active Matrix Capacitive Sensors for Touch Panel LTPS-TFT LCDs," *SID 08 Digest*, pp. 834-837.

Lee, S.K. et al. (Apr. 1985). "A Mutli-Touch Three Dimensional Touch-Sensitive Tablet," *CHI '85 Proceedings*, pp. 21-25.

Non-Final Office Action mailed Nov. 4, 2009, for U.S. Appl. No. 11/619,433, filed Jan. 3, 2007, 33 pages.

Notice of Allowance mailed Jun. 7, 2010, for U.S. Appl. No. 11/619,433, filed Jan. 3, 2007, 10 pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

European Search Report mailed Apr. 17, 2012, for EP Patent Application No. 11188985.3, six pages.

Taiwanese Search Report mailed Aug. 16, 2012, for TW Patent Application No. 097100216, two pages.

* cited by examiner

SIMULTANEOUS SENSING ARRANGEMENT

CROSS-REFERENCE TO RELATED APPLICATIONS

This application is a division of U.S. patent application Ser. No. 11/619,433, filed Jan. 3, 2007, the entire disclosure of which is incorporated herein by reference. The present application is also related to the following U.S. patents and patent applications, each of which is hereby incorporated by reference in its entirety:

U.S. Pat. No. 6,323,846, titled "Method and Apparatus for Integrating Manual Input," issued Nov. 27, 2001;

U.S. patent application Ser. No. 10/840,862, titled "Multipoint Touchscreen," filed May 6, 2004, now U.S. Pat. No. 7,663,607, issued Feb. 16, 2010; and U.S. patent application Ser. No. 11/381,313, titled "Multipoint Touch Surface Controller," filed May 2, 2006, which was published on Nov. 8, 2007 as Publication No. 2007-0257890 A1.

BACKGROUND

Recently, interest has developed in touch and/or proximity-based input systems for electronic devices and computer systems that are capable of recognizing multiple touch and/or hover events simultaneously. Many of these systems, for example those based on mutual capacitance or certain optical sensing arrangements, involve applying periodic stimulus waveforms to a plurality of sense points and detecting sense waveforms that can be related to the periodic stimulus waveform by the amount of touch and/or proximity present at the sense point. In some embodiments, these systems apply periodic stimulus waveforms to drive lines that are coupled to sense lines at the sense points. Typically, stimulus waveforms have been applied to these drive lines one at a time. Because devices typically include a plurality of these drive lines, each drive line has been driven sequentially.

SUMMARY

According to one embodiment of the invention, a method of deriving touch information from a touch sensitive surface is provided. The touch sensitive device can include a plurality of sensing points. Each sensing point can be located at or near a crossing of a drive line and a sense line. For example, the method can include simultaneously (or substantially simultaneously) stimulating a plurality of the drive lines with one or more unique drive signals. For example, the signals may have predetermined phase and/or frequency relationships. The method can further include sensing a sense signal on at least one of the sense lines. The sense signal can relate to the drive signals by touch or proximity of one or more objects to one or more sensing points located at or near the crossing of the plurality of drive lines and the at least one sense line. The method can also include, for example, deriving touch information from the sense signal. Touch may be derived from the sense signal by deriving a plurality of values from the sense signal, e.g., by integrating the sense signal over one or more time periods and deriving touch information from a mathematical combination of the plurality of values.

In another embodiment, the invention can relate to a multi-touch sensing device. The touch sensing device can include, for example, a touch sensitive surface with a plurality of sensing points located at a crossings of drive lines and sense lines. The touch sensing device can also include drive circuitry configured to simultaneously apply unique drive signals to a plurality of the drive lines. For example, the signals may have predetermined phase and/or frequency relationships. The touch sensing device can also include sense circuitry that is configured to detect a sense signal in at least one sense line and derive touch information from this sense signal for one or more of the sense points. Such a touch sensing device may be based, for example, on self or mutual capacitance.

In yet another embodiment, the invention can relate to an electronic device or computer system incorporating a touch sensing arrangement or implementing a touch sensing method, as discussed above. The electronic device can take a variety of forms, including, for example, a desktop computer, a tablet computer, a notebook computer, a handheld computer, a personal digital assistant, a media player, or a mobile telephone. Other form factors are also possible.

In still another embodiment, the present invention can relate to a method of deriving touch information from a touch sensitive surface. The method can include performing a coarse scan of a region of the touch sensitive surface to determine whether a touch is present within the first region. If a touch is present, fine scanning of the region may be performed to determine more exact data about the touch or touches that are present within the region. If a touch is not present, fine scanning any be omitted, and a coarse scan of another region may begin. By eliminating unnecessary fine scans, time and power savings can result.

BRIEF DESCRIPTION OF THE DRAWINGS

The aforementioned and other aspects of the invention may best be understood by reference to the following description taken in conjunction with the accompanying drawings in which.

DETAILED DESCRIPTION

Figure 1:
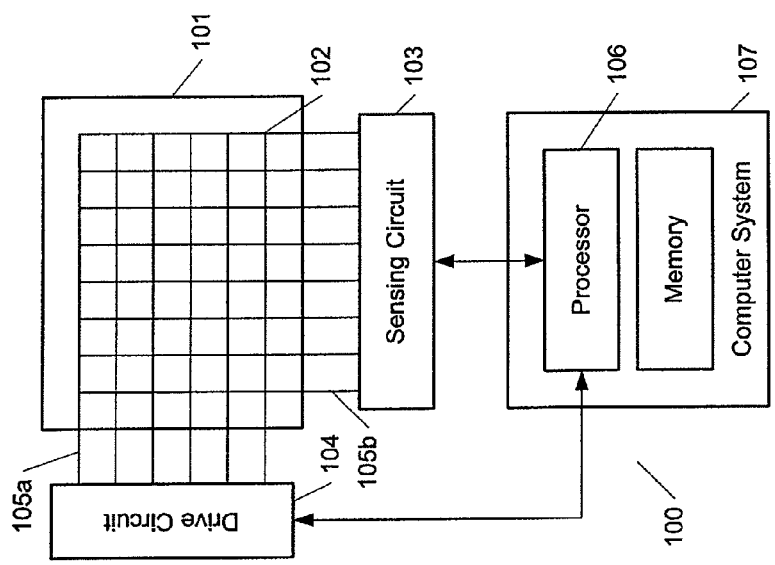
FIG. 1 illustrates a multi-touch sensing device used as an input device to a computer system in accordance with an embodiment of the present invention.

Recognizing multiple simultaneous or near-simultaneous touch events may be accomplished with a multi-touch sensing arrangement as illustrated in FIG. 1. Multi-touch sensing arrangement 100 can detect and monitor multiple touch attributes (including, for example, identification, position, velocity, size, shape, and magnitude) across touch sensitive surface 101, at the same time, nearly the same time, at different times, or over a period of time. Touch sensitive surface 101 can provide a plurality of sensor points, coordinates, or nodes 102 that function substantially independently of one another and that represent different points on a touch sensitive surface. Sensing points 102 may be positioned in a grid or a pixel array, with each sensing point capable of generating a signal at the same time. Sensing points 102 may be considered as mapping touch sensitive surface 101 into a coordinate system, for example, a Cartesian or polar coordinate system.

A touch sensitive surface may, for example, be in the form of a tablet or a touch screen. To produce a touch screen, the capacitance sensing points and other associated electrical structures can be formed with a substantially transparent conductive medium, such as indium tin oxide (ITO). The number and configuration of sensing points 102 may be varied. The number of sensing points 102 generally depends on the desired resolution and sensitivity. In touch-screen applications, the number of sensing points 102 may also depend on the desired transparency of the touch screen.

Figure 2:
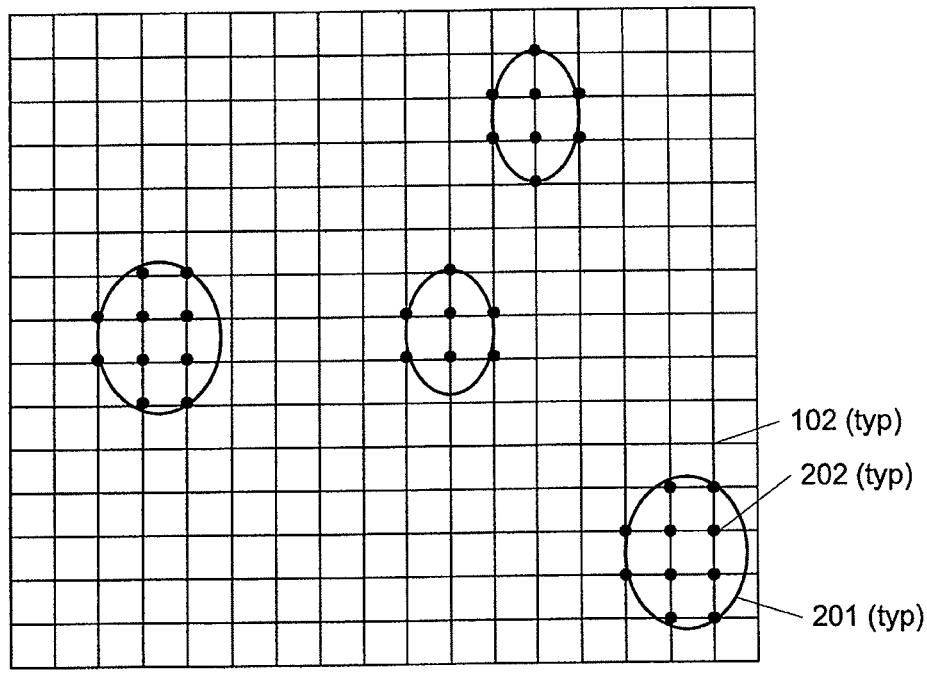
FIG. 2 illustrates a plurality of contact patch areas corresponding to an object in proximity to a plurality of sense points of a multi-touch surface in accordance with an embodiment of the present invention.

Using a multi-touch sensing arrangement, like that described in greater detail below, signals generated at nodes 102 of multi-touch sensor 101 may be used to produce an image of the touches at a particular point in time. For example, each object (e.g., finger, stylus, etc.) in contact with or in proximity to touch sensitive surface 101 can produce contact patch area 201, as illustrated in FIG. 2. Each of contact patch area 201 may cover several nodes 102. Covered nodes 202 may detect the object, while remaining nodes 102 do not. As a result, a pixilated image of the touch surface plane (which may be referred to as a touch image, a multi-touch image, or a proximity image) can be formed. The signals for each contact patch area 201 may be grouped together. Each contact patch area 201 may include high and low points based on the amount of touch at each point. The shape of contact patch area 201, as well as the high and low points within the image, may be used to differentiate contact patch areas 201 that are in close proximity to one another. Furthermore, the current image can be compared to previous images to determine how the objects may be moving over time, and what corresponding action should be performed in a host device as a result thereof.

Many different sensing technologies can be used in conjunction with these sensing arrangements, including resistive, capacitive, optical, etc. In capacitance-based sensing arrangements, as an object approaches touch-sensitive surface 101, a small capacitance forms between the object and sensing points 102 in proximity to the object. By detecting changes in capacitance at each of the sensing points 102 caused by this small capacitance, and by noting the position of the sensing points, a sensing circuit 103 can detect and monitor multiple touches. The capacitive sensing nodes may be based on self capacitance or mutual capacitance.

In self capacitance systems, the "self" capacitance of a sensing point is measured relative to some reference, e.g., ground. Sensing points 102 may be spatially separated electrodes. These electrodes are coupled to driving circuitry 104 and sensing circuitry 103 by conductive traces 105a (drive lines) and 105b (sense lines). In some self-capacitance embodiments, a single conductive trace to each electrode may be used as both a drive and sense line.

In mutual capacitance systems, the "mutual" capacitance between a first electrode and a second electrode can be measured. In mutual capacitance sensing arrangements, the sensing points may be formed by the crossings of patterned conductors forming spatially separated lines. For example, driving lines 105a may be formed on a first layer and sensing lines 105b may be formed on a second layer 105b such that the drive and sense lines cross or "intersect" one another at sensing points 102. The different layers may be different substrates, different sides of the same substrate, or the same side of a substrate with some dielectric separation. Because the drive and sense lines are separated, there is a capacitive coupling node at each "intersection."

The manner in which the drive and sense lines are arranged may vary. For example, in a Cartesian coordinate system (as illustrated), the drive lines may be formed as horizontal rows, while the sense lines may be formed as vertical columns (or vice versa), thus forming a plurality of nodes that may be considered as having distinct x and y coordinates. Alternatively, in a polar coordinate system, the sense lines may be a plurality of concentric circles with the drive lines being radially extending lines (or vice versa), thus forming a plurality of nodes that may be considered as having distinct r and angle coordinates. In either case, drive lines 105a may be connected to drive circuit 104, and sensing lines 105b may be connected to sensing circuit 103.

During operation, a drive signal (e.g., a periodic voltage) is applied to each drive line 105a. When driven, the charge impressed on drive line 105a can capacitively couple to the intersecting sense lines 105b through nodes 102. This can cause a detectable, measurable current and/or voltage in sense lines 105b. The relationship between the drive signal and the signal appearing on sense lines 105b is a function of the capacitance coupling the drive and sense lines, which, as noted above, may be affected by an object in proximity to node 102. Capacitance sensing circuit (or circuits) 103 may sense sensing lines 105b and may determine the capacitance at each node as described in greater detail below.

As discussed above, conventional drive lines 105a were driven one at a time, while the other drive lines were grounded. This process was repeated for each drive line 105a until all the drive lines had been driven, and a touch image (based on capacitance) was built from the sensed results. Once all the lines 105a had been driven, the sequence would repeat to build a series of touch images. However, in some embodiments of the present invention, multiple drive lines may be driven simultaneously or nearly simultaneously, as described, for example, below. As used herein, "simultaneously" encompasses precisely simultaneous as well as nearly simultaneous events. For example, simultaneous events may begin at about the same time, end at about the same time, and/or take place over at least partially overlapping time periods.

Figure 3:
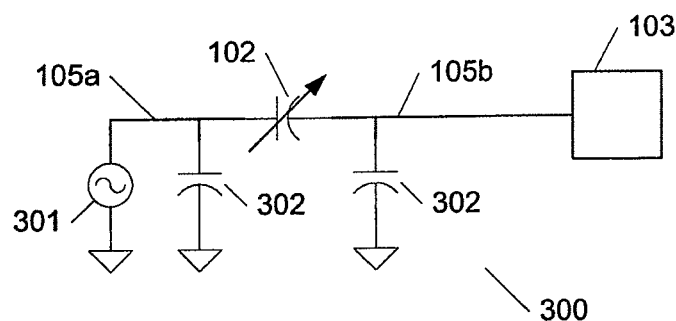
FIG. 3 illustrates a simplified schematic diagram of a mutual capacitance sensing circuit that may be used in an embodiment of the present invention.

FIG. 3 illustrates a simplified schematic diagram of mutual capacitance circuit 300 corresponding to the arrangement described above. Mutual capacitance circuit 300 may include drive line 105a and sense line 105b, which are spatially separated thereby forming capacitive coupling node 102. Drive line 105a may be electrically (i.e., conductively) coupled to drive circuit 104 represented by voltage source 301. Sense line 105b may be electrically coupled to capacitive sensing circuit 103. Both drive line 105a and sense line 105b may, in some cases, include some parasitic capacitance 302.

As noted above, in the absence of a conductive object proximate the intersection of drive line 105a and sense line 105b, the capacitive coupling at node 102 stays fairly constant. However, if an electrically conductive object (for example, a user's finger, stylus, etc.) comes in proximity to node 102, the capacitive coupling (i.e., the capacitance of the local system) changes. The change in capacitive coupling changes the current (and/or voltage) carried by sense line 105b. Capacitance sensing circuit 103 may note the capacitance change and the position of node 102 and report this information in some form to processor 106 (FIG. 1).

With reference to FIG. 1, sensing circuit 103 may acquire data from touch surface 101 and supply the acquired data to processor 106. In some embodiments, sensing circuit 103 may be configured to send raw data (e.g., an array of capacitance values corresponding to each sense point 102) to processor 106. In other embodiments, sensing circuit 103 may be configured to process the raw data itself and deliver processed touch data to processor 106. In either case, the processor may then use the data it receives to control operation of computer system 107 and/or one or more applications running thereon. Various implementations along these lines are described in the applications referenced above, and include a variety of computer systems having touch pads and touch screens.

In some embodiments, sensing circuit 103 may include one or more microcontrollers, each of which may monitor one or more sensing points 102. The microcontrollers may be application specific integrated circuits (ASICs), that work with firmware to monitor the signals from touch sensitive surface 101, process the monitored signals, and report this information to processor 106. The microcontrollers may also be digital signal processors (DSPs). In some embodiments, sensing circuit 103 may include one or more sensor ICs that measure the capacitance in each sensing line 105b and report measured values to processor 106 or to a host controller (not shown) in computer system 107. Any number of sensor ICs may be used. For example, a sensor IC may be used for all lines, or multiple sensor ICs may be used for a single line or group of lines.

Figure 4:
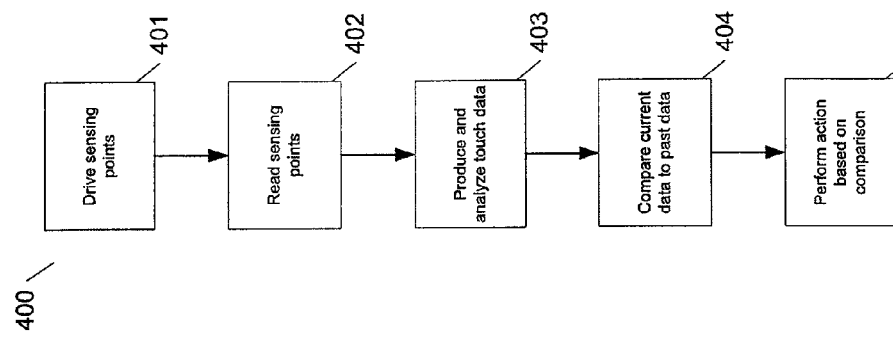
FIG. 4 illustrates a process for operating a multi-touch sensing device in accordance with an embodiment of the present invention.

FIG. 4 illustrates at a high level process 400 for operating a multi-touch sensing arrangement, like that described above. The process may begin at block 401 where plurality of sensing points 102 are driven. Following block 401, the process flow can proceed to block 402, where the outputs from sensing points 102 are read. For example, a capacitance value for each sensing point 102 can be obtained. Following block 402, the process can proceed to block 403 where an image or other form of data (signal or signals) of the touch at one moment in time can be produced and thereafter analyzed to determine where objects touching or in proximity to the touch sensor may be located. Following block 403, the process can proceed to block 404, where the current image or signal may be compared to one or more past images or signals to determine a change in one or more of the shape, size, location, direction, speed, acceleration, pressure, etc. for each object. This information can be subsequently used (in step 405) to perform an action in computer system 107, ranging from moving a pointer or cursor to complex gesture-based interactions.

Figure 5:
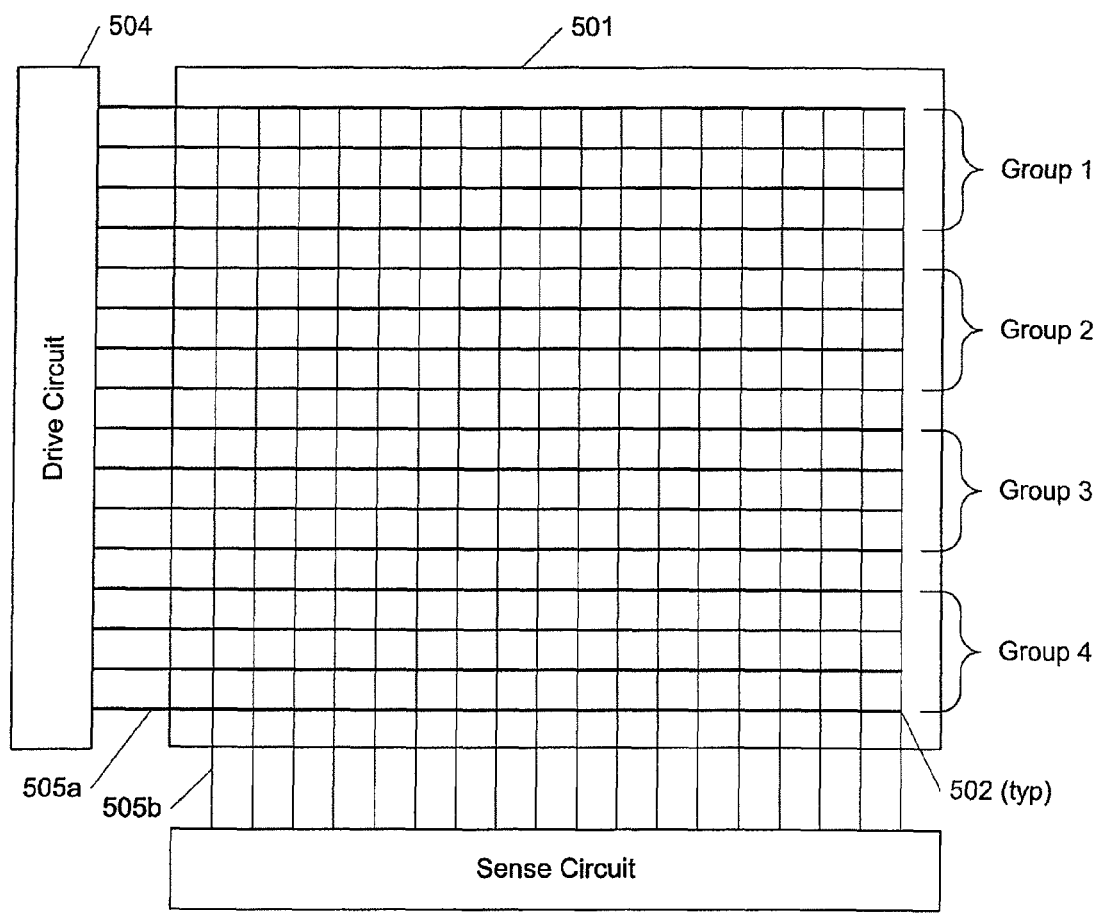
FIG. 5 illustrates a multi-touch sensing device in accordance with an embodiment of the present invention.

As noted above, enhanced operation of multi-touch sensing arrangements may be achieved by driving multiple rows simultaneously. An example multi-touch sensing device 500 with which multi-row stimulation may be employed is illustrated in FIG. 5 and has reference numerals generally corresponding to sensing arrangement 101 illustrated in FIG. 1. In the given example, touch sensitive surface 501 has sixteen drive rows 505a, although any number of drive rows could be used. The drive rows may be divided, for example, into four groups, e.g., Group 1, Group 2, Group 3, and Group 4, each including four drive rows 505a. Other numbers of groups and numbers of rows per group may also be employed.

Figure 7:
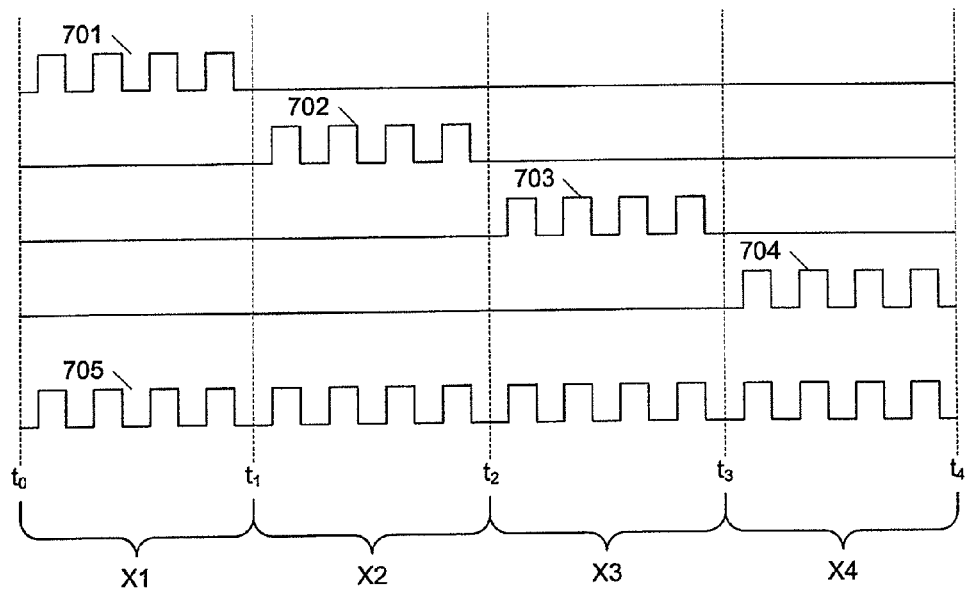
FIG. 7 illustrates a single-line stimulation arrangement according to the prior art.

Scanning of multi-touch sensor arrays is described in various references, including U.S. patent application Ser. No. 11/381,313, which is hereby incorporated by reference. The process may be briefly summarized by reference to FIG. 7. In general, a periodic waveform (e.g., a series of square wave pulses) is applied sequentially to drive rows 505a. For example, a first group of pulses 701 may be applied to Row A, followed by a second group of pulses 702 applied to row B, followed by a third group of pulses 703 applied to Row C, followed by a fourth group of pulses 704 applied to Row D. These periodic waveforms are capacitively coupled into sense lines 505b, generally resulting in sensed waveform 705 on each sense line. Sensed waveform 705 can be input integrated over a predetermined time period to measure the capacitive coupling between drive lines 505a and sense lines 505b at each node 502. Other processing, such as filtering, demodulation, etc., may also occur.

In sensed waveform 7051 the time period from to $t_0$ $t_1$ corresponds to the stimulus of Row A. Integrating the sensed waveform over this time period results in a numerical value X1, which can correspond to the capacitance of a node at the intersection of Row A and the column being sensed. Similarly, the time period from $t_1$ to $t_2$ corresponds to Row B, the time period from $t_2$ to $t_3$ corresponds to Row C, and the time period from $t_3$ to $t_4$ corresponds to Row D. Integrating the sensed waveform over each of these time periods can give numerical values X2, X3, and X4 corresponding to the capacitance of nodes at the intersection of the Rows B, C, and D and the column being sensed.

Figure 8:
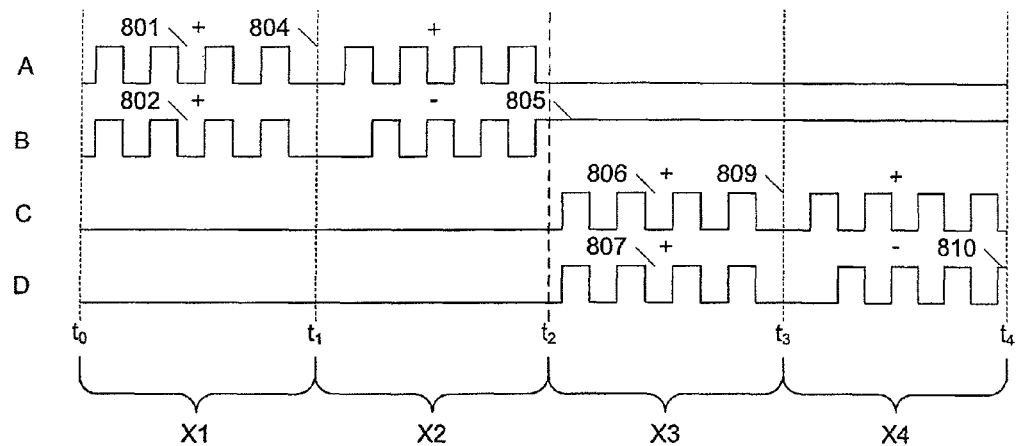
FIG. 8 illustrates a two-line simultaneous stimulation arrangement in accordance with an embodiment of the present invention.

FIG. 8 illustrates a multi-line stimulation arrangement in which two lines may be stimulated simultaneously. Specifically, Row A and Row B may be simultaneously (or nearly simultaneously) stimulated with waveforms 801 and 802. As can be seen, the phase of waveform 801 may be adjusted, e.g., after the fourth pulse. As a result, the remaining pulses of waveforms 801 and 802 may be 180° out of phase. Similarly, Row C and Row D may be simultaneously (or nearly simultaneously) stimulated with waveforms 806 and 807. Again, the phase of waveform 806 may be adjusted, e.g., after the fourth pulse. As a result, the remaining pulses of waveforms 806 and 807 may be 180° out of phase. The phase relationships between the waveforms may be easily understood with reference to the + and − signs above.

Unlike the example described above with reference to FIG. 7, the time periods $t_0$ to $t_1$, $t_1$ to $t_2$, $t_2$ to $t_3$, and $t_3$ to $t_4$ may no longer uniquely correspond to Rows A-D. Likewise, the measured values X1, X2, X3, and X4 resulting from integrating the sensed waveform (not shown) over these time periods no longer uniquely correspond to the capacitance of a node at the intersection of a particular row and the column being sensed. In the example of FIG. 8, time periods $t_0$ to $t_1$ and $t_1$ to $t_2$, along with their corresponding measured values X1 and X2, correspond together to both Row A and Row B. Similarly, time periods $t_2$ to $t_3$ and $t_3$ to $t_4$, along with their corresponding measured values X3 and X4, correspond together to both Row C and Row D. However, because of the phase difference between the stimulus waveforms 801 and 802, the effects of stimulating Row A only and Row B only can be isolated from each other. Similarly, because of the phase difference between the stimulus waveforms 806 and 807, the effects of stimulating Row C only and Row D only can be isolated from each other.

Specifically, because stimulus waveforms 801 and 802 are in phase over time period $t_0$ to $t_1$ and out of phase over time period $t_1$ to $t_2$ the integration result X1 plus the integration result X2 (i.e., X1+X2) can yield a value corresponding to the capacitance of a node at the intersection of Row A and the line being sensed, i.e., only the effect of the stimulus of Row A. Similarly, the integration result X1 minus the integration result X2 (i.e., X1−X2) can yield a value corresponding to the capacitance of a node at the intersection of Row B and the line being sensed, i.e., only the effect of the stimulus of Row B.

The same applies to Rows C and D. Because stimulus waveforms 806 and 807 are in phase over time period $t_2$ to $t_3$ and out of phase over time period $t_3$ to $t_4$, the integration result X3 plus the integration result X4 (i.e., X3+X4) can yield a value corresponding to the capacitance of a node at the intersection of Row C and the line being sensed, i.e., only the effect of the stimulus of Row C. Similarly, the integration result X3 minus the demodulation result X4 (i.e., X3−X4) can yield a value corresponding to the capacitance of a node at the intersection of Row D and the line being sensed, i.e., only the effect of the stimulus of Row D.

Figure 9:
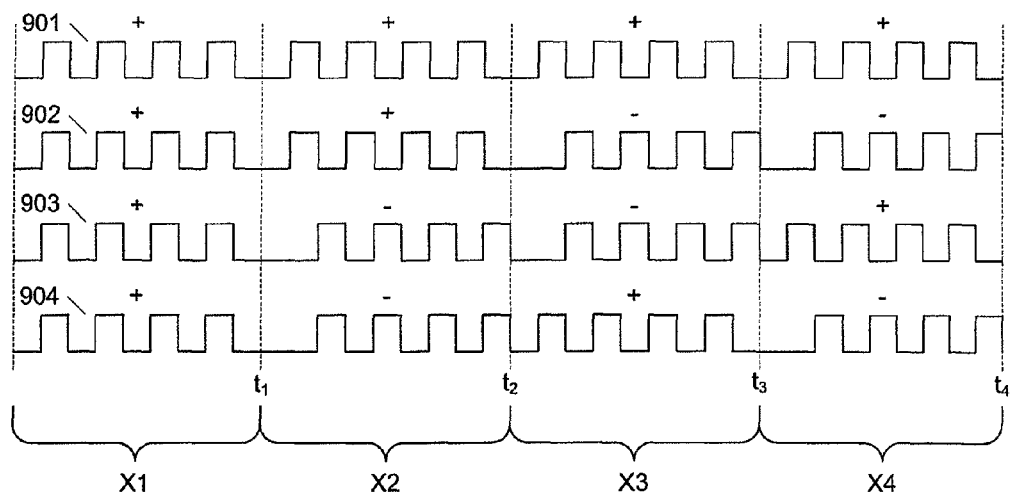
FIG. 9 illustrates a four-line simultaneous stimulation arrangement in accordance with an embodiment of the present invention.

FIG. 9 illustrates an exemplary multi-line stimulation arrangement in which four lines are stimulated simultaneously. During a first period from $t_0$ to $t_1$, the periodic waveforms 901-904 applied to Rows A-D are in phase. At time $t_1$, e.g., after the fourth pulse, the phase of waveforms 901 and 902 can be adjusted so that waveforms 901 and 902 are 180° out of phase with respect to waveforms 903 and 904. Similarly at time $t_2$, e.g., after the next four pulses, the phases of waveforms 901 and 903 are adjusted. This can result in waveforms 901 and 904 being 180° out of phase with respect to waveforms 902 and 903. Finally, at time $t_3$, e.g., after four more pulses, the phase of waveforms 901 and 902 can again be adjusted. This can result in waveforms 901 and 903 being 180° out of phase with respect to waveforms 902 and 904. The phase relationships between the various waveforms can be understood with reference to the + and − signs in the figure.

As in the preceding example, the phase relationships between waveforms 901-904 allow the effects of the stimulus on each individual row to be isolated as mathematical combinations of the measured integration results. Specifically, the effects of the stimulus of Row A can be determined by the expression X1+X2+X3+X4. The effects of the stimulus of Row B can be determined by summing X1+X2−X3−X4. The effects of the stimulus of Row C can be determined by X1−X2−X3+X4. The effects of the stimulus of row D can be determined by X1−X2+X3−X4.

Figure 6:
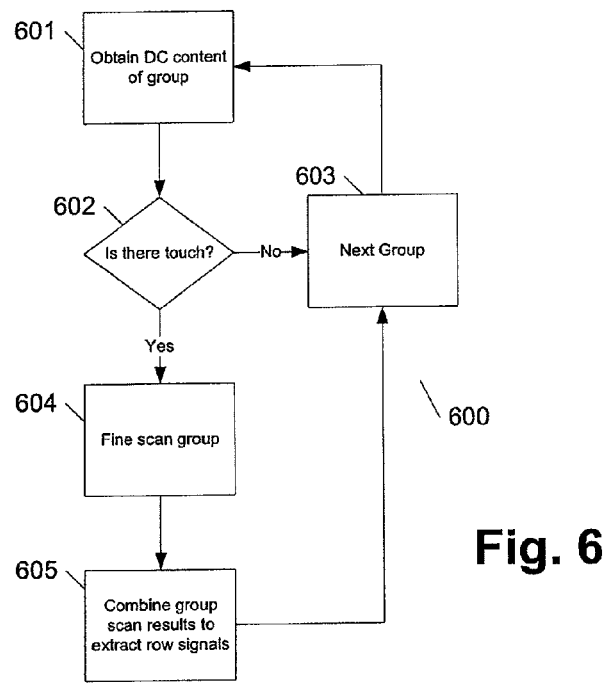
FIG. 6 illustrates a process for performing multi-line stimulation in accordance with an embodiment of the present invention.

The process of operation 600 of the multi-touch sensing arrangement 500 with multi-row stimulation may be further understood with reference to the flow chart of FIG. 6. First, the DC content for a group of rows can be obtained 601. In the example of FIG. 8, the DC content of the group of rows including Rows A and B can be obtained by integrating the sensed waveform over time period $t_0$ to $t_1$. This DC content can indicate (somewhat coarsely) whether there is any touch present within a given group, e.g., Rows A and B, corresponding to a particular region of touch surface 501. If at decision block 602, it is determined that there is no touch within a given group/region the next group (e.g., Rows C and D) can be similarly scanned. This may be implemented, for example, by implementing counter 603. If at decision block 602, it is determined that there is touch within a given group/region as indicated by the DC content of the group, a fine scan of the group is performed in block 604. The results of the fine scan may be combined to extract the signals corresponding to each row as described above. Once all groups have been scanned, the process repeats.

Turning back to FIGS. 5 and 6, each group of rows may be scanned according to the principles described in the foregoing paragraphs. A multi-touch sensing arrangement may comprise any number of rows and any number of groups. In some embodiments, a multi-touch sensing arrangement can employ multi-line stimulation on a single group, i.e., all lines of the device may be stimulated simultaneously or nearly simultaneously. Additionally, although described in terms of rows and columns, the drive and sense lines may be arranged in any geometric arrangement.

Multi-line stimulation as described above may provide a number of advantages. For example, when multiple rows are stimulated simultaneously, the stimulus voltage can be reduced. Specifically, the additive effect of multiple-row stimulus can result in the same sensed waveform amplitude for a lower "per row" stimulus voltage. For example, a single-line scanning arrangement using an 18 Vpp (volts peak-to-peak) stimulus voltage could use a 9 Vpp stimulus voltage with two lines being simultaneously stimulated or with a 4.5 Vpp stimulus voltage with four lines being simultaneously stimulated, etc., to obtain similar sensed waveform amplitude.

Reducing the stimulus voltage can allow drive signals to be supplied directly from a driver chip without requiring a high voltage booster. The reduced voltage can also help to avoid fringe field and transistor breakdown issues. The reduced voltage can also result in reduced power consumption. Because power scales as square of voltage, cutting voltage by a factor of four (for four row simultaneous stimulation) cuts the power per row by a factor of 16. However, because there are four rows being driven, the actual power savings may only be a factor of 4. However, additional power may also be saved by not doing a fine-scan when there is no touch detected during a DC scan of the region, as described above.

A variation on the multi-row stimulation techniques described above may be referred to as differential multi-row stimulation. Differential multi-row stimulation may be understood with reference to the table below, which shows the polarities of the stimulating waveforms for the multi-row stimulation example of FIG. 9 above (Multi-Row Stimulation) compared to the polarities of the stimulating waveforms for a differential multi-row stimulation example (Differential Multi-Row Stimulation). Differential multi-row stimulation may generally correspond to the multi-row stimulation examples discussed above, except that the polarities of the stimulating waveforms may be rearranged as indicated below.

Stimulus Voltage Phase Comparison

| | Multi-Row Stimulation | | | | | Differential Multi-Row Stimulation | | | | |
|---|---|---|---|---|---|---|---|---|---|---|
| Row | X1 | X2 | X3 | X4 | Row Sum | Row | X1 | X2 | X2 | X4 | Row Sum |
| A | + | + | + | + | +4 | A | − | + | − | + | 0 |
| B | + | + | − | − | 0 | B | + | + | − | − | 0 |
| C | + | − | − | + | 0 | C | + | − | + | − | 0 |
| D | + | − | + | − | 0 | D | − | − | + | + | 0 |
| Col. Sum | +4 | 0 | 0 | 0 | | Col. Sum | 0 | 0 | 0 | 0 | |

As can be seen from the table, in the multi-row stimulation example, the net polarity applied across row A can have a DC component of four times the amplitude of the stimulus waveform. Similarly, the first time period (during which the value X1 may be measured) also can have a net DC component of four times the amplitude of the stimulus waveform. In the differential multi-row stimulation example, the polarities may be rearranged such that no row nor time period has a DC component. The absence of a DC component can result in a number of advantages, including allowing the charge sensing circuitry to operate with zero offset, automatic baseline removal, inherent centroids computation, and increased signal to noise ratio. In some embodiments, it may be desired to stimulate all rows of the sensor simultaneously (i.e., have only one group of rows) as differences in DC offset from one group to another may be lost because of an absence of DC content in the stimulus.

Figure 11:
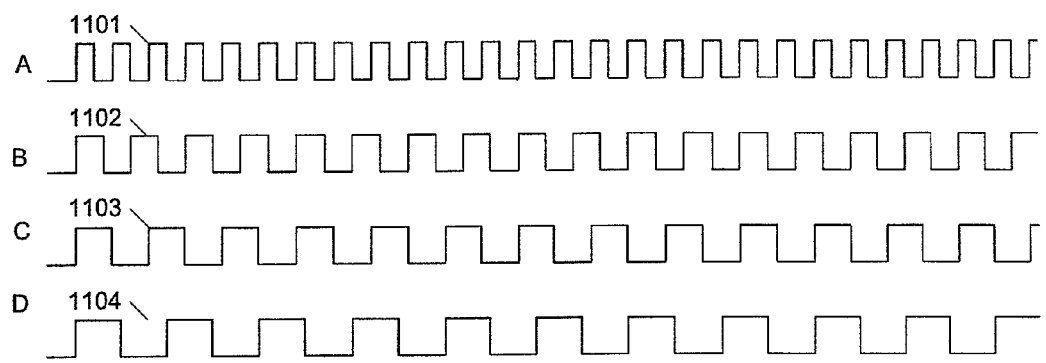
FIG. 11 illustrates a frequency-based four-line simultaneous stimulation arrangement in accordance with an embodiment of the present invention.

Other variations of the multi-row stimulation concept include phase or frequency-based multi-row stimulation. In the foregoing examples, different rows can be stimulated with waveforms having polarity (phase) differences so that effects of a given row may be isolated in the aggregate sense waveform. Another way to allow this type of isolation, illustrated in FIG. 11, is to stimulate each row of a group with a stimulus waveform having a different frequency. One or more demodulation circuits can then separate these frequencies in the sense waveform so that the contributions of each stimulated line may be isolated. In many embodiments demodulator circuits may already be present for noise filtering.

Examples of other possibilities for stimulus waveforms according to the principles described herein may be understood with reference to FIG. 12. Timing signal 1201 can define a stimulus time window. Each line can have a corresponding timing signal. During the stimulus time window, e.g., when signal 1201 is high, a stimulation waveform can be applied to the corresponding line (or lines). This stimulation waveform may take a variety of forms, including a square wave, a sine wave, an exponentially decaying sine wave, a pulsed sine wave, etc.

Figure 12A:
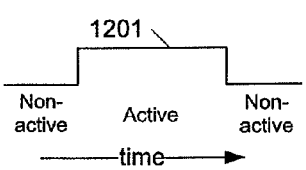
FIG. 12 illustrates generally various alternatives for stimulus windows in accordance with an embodiment of the present invention.
Figure 12B:
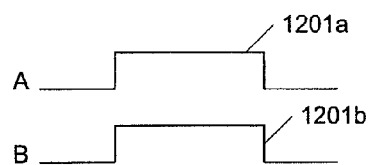
Figure 12C:
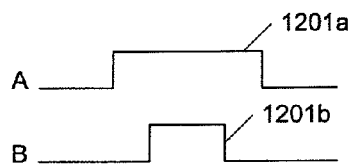
Figure 12D:
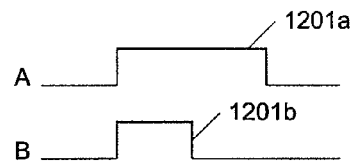
Figure 12C:
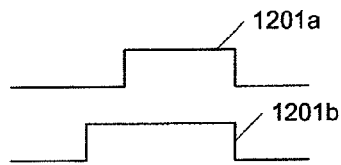

Simultaneous stimulation, as used herein, means that at least one stimulus is applied to at least two lines during the same time period (e.g., window, which can include one or more pulses of any shape and in any combination). In other words, simultaneous stimulation involves at least two lines having stimulus windows that at least partially overlap in time. For example, in FIG. 12B, a stimulus window for Row A, defined by timing signal 1201a can begin at the same time, extend for the same duration, and end at the same time as a stimulus window for Row B, defined by timing signal 1201b. Alternatively, as illustrated in FIG. 12C, the stimulus windows for Row A (defined by timing signal 1201a) and Row B (defined by timing signal 1201b) may begin and end at different times, but have at least some overlapping portion. Another alternative, illustrated in FIG. 12D, is for stimulus windows for Row A (defined by timing signal 1201a) and Row B (defined by timing signal 1201b) may begin at the same time, but end at different times. Still another alternative, illustrated in FIG. 12E, is for stimulus windows for Row A (defined by timing signal 1201a) and Row B (defined by timing signal 1201b) to begin at different times but end at the same time. These various arrangements can also be extended to a number of rows greater than two, with complete flexibility so long as there is some stimulation overlap between at least some rows.

Figure 10:
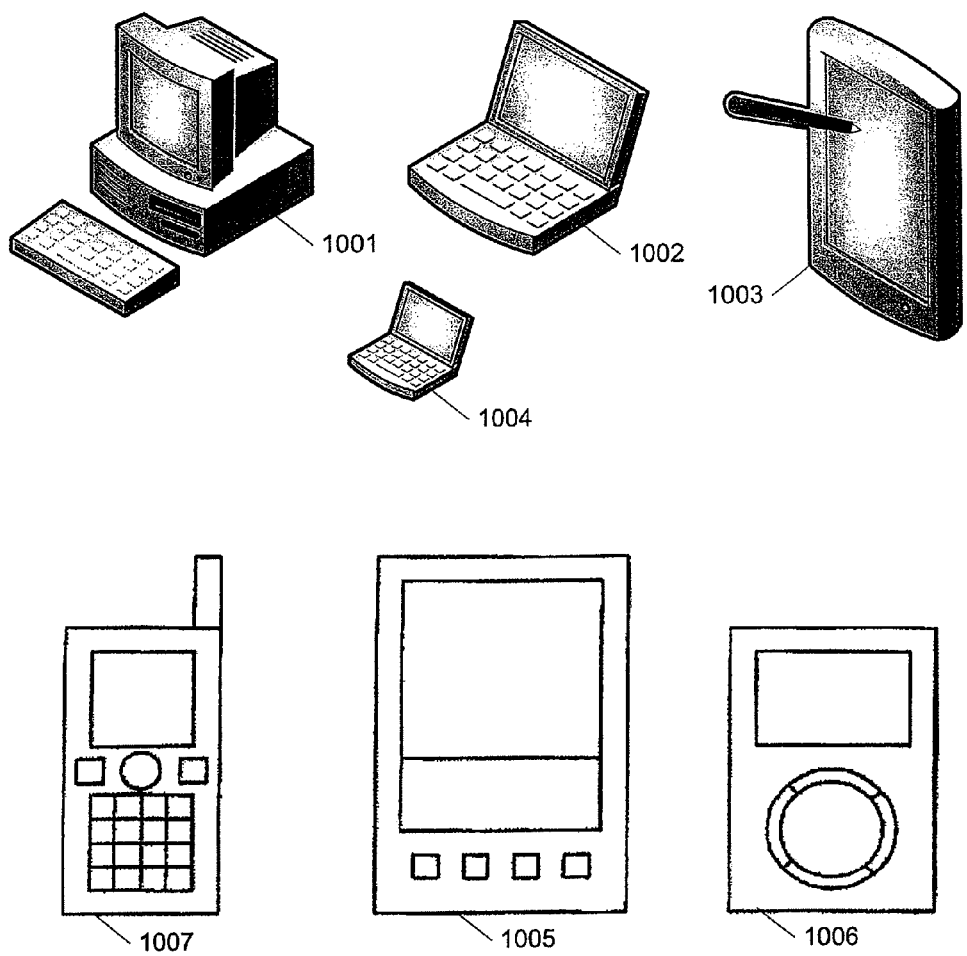
FIG. 10 illustrates a variety of electronic device and computer system form factors that may be used in accordance with an embodiment of the present invention.

The principles described herein may be used to devise input devices for a variety of electronic devices and computer systems. These electronic devices and computer system may be any of a variety of types illustrated in FIG. 10, including desktop computers 1001, notebook computers 1002, tablet computers 1003, handheld computers 1004, personal digital assistants 1005, media players 1006, mobile telephones 1007, and the like. Additionally, the electronic devices and computer systems may be combinations of these types, for example, a device that is a combination of a personal digital assistant, media player, and mobile telephone.

Other alternations, permutations, and combinations of the aforementioned embodiments are also possible. For example, multiple touch and proximity systems may be designed based on infrared/optical sensing arrangements that rely on periodic waveform stimulus and reflections from hand parts or other touch objects to detect touch and/or hover events. The principles herein, though described with reference to capacitive systems, are equally applicable to any systems in which touch or proximity sensing depends on information extracted from periodic stimulus waveforms. It is therefore intended that the following claims be interpreted as including all alterations, permutations, combinations and equivalents of the foregoing.

What is claimed is:

1. A touch sensing device comprising:
a touch sensitive surface based on mutual capacitance having a plurality of sensing points, each sensing point being associated with one of a plurality of drive lines and one of a plurality of sense lines;
drive circuitry that applies drive signals simultaneously to at least two of the plurality of drive lines during a time period, wherein the drive signals have different frequencies and are greater than 0 Hz;
sense circuitry that detects a sense signal in at least one sense line, the sense signal being related to the drive signals by touch or proximity of one or more objects to one or more sensing points associated with the sense line, and derives touch information for the one or more sensing points from the sense signal.

2. The touch sensing device of claim 1 wherein the sense circuitry comprises at least one microcontroller.

3. The touch sensing device of claim 2 wherein the at least one microcontroller is an application specific integrated circuit (ASIC).

4. The touch sensing device of claim 2 wherein the at least one microcontroller is a digital signal processor (DSP).

5. The touch sensing device of claim 2 wherein the sense circuitry derives a plurality of values from the sense signal by integrating the sense signal over time.

6. The touch sensing device of claim 1 wherein the sense circuitry derives touch information from the sense signal by deriving a plurality of values from the sense signal and deriving touch information from a mathematical combination of the plurality of values.

7. The touch sensing device of claim 1 wherein the touch information comprises an array of touch values at each sensing point.

8. The touch sensing device of claim 7 wherein the touch values correspond to a capacitance measurement at each sensing point.

9. The touch sensing device of claim 1 wherein the touch sensitive surface is part of a touch screen.

10. An electronic device having as an input device a touch sensing device according to any of claim 1, 5, or 6.

11. The electronic device of claim 10 wherein the electronic device is one of a desktop computer, a tablet computer, and a notebook computer.

12. The electronic device of claim 10 wherein the electronic device comprises at least one of a handheld computer, a personal digital assistant, a media player, and a mobile telephone.

13. A mobile telephone having as an input device a touch sensing device according to any of claim 1, 5, or 6.

14. A method of driving a touch sensitive module having a plurality of drive lines, a plurality of sense lines, and a plurality of sensing points, the method comprising:

simultaneously stimulating at least two of the plurality of drive lines with drive signals of different frequencies that are greater than 0 Hz;

sensing at least one sense signal on at least one of the plurality of sense lines, wherein the sense signal is related to a contact or proximity event of at least one object at or near one or more sensing points of the plurality of sensing points, each sensing point being associated with a mutual capacitance between one of the plurality of drive lines and one of the plurality of sense lines; and deriving touch information from the sense signal.

15. The method of claim 14 wherein deriving touch information from the sense signal comprises:

deriving a plurality of values from the sense signal; and deriving touch information from a mathematical combination of the plurality of values.

16. The method of claim 15 wherein deriving a plurality of values from the sense signal comprises integrating the sense signal over time.

17. The method of claim 14 wherein the touch information comprises an array of touch values at each of a plurality of sensing points, each sensing point being associated with at least one drive line of the plurality of conductive lines and at least one sense line of the plurality of conductive lines.

* * * * *